May 17, 1927.
H. D. GARRETSON
X-RAY SYSTEM
Filed Dec. 20, 1921
1,629,338
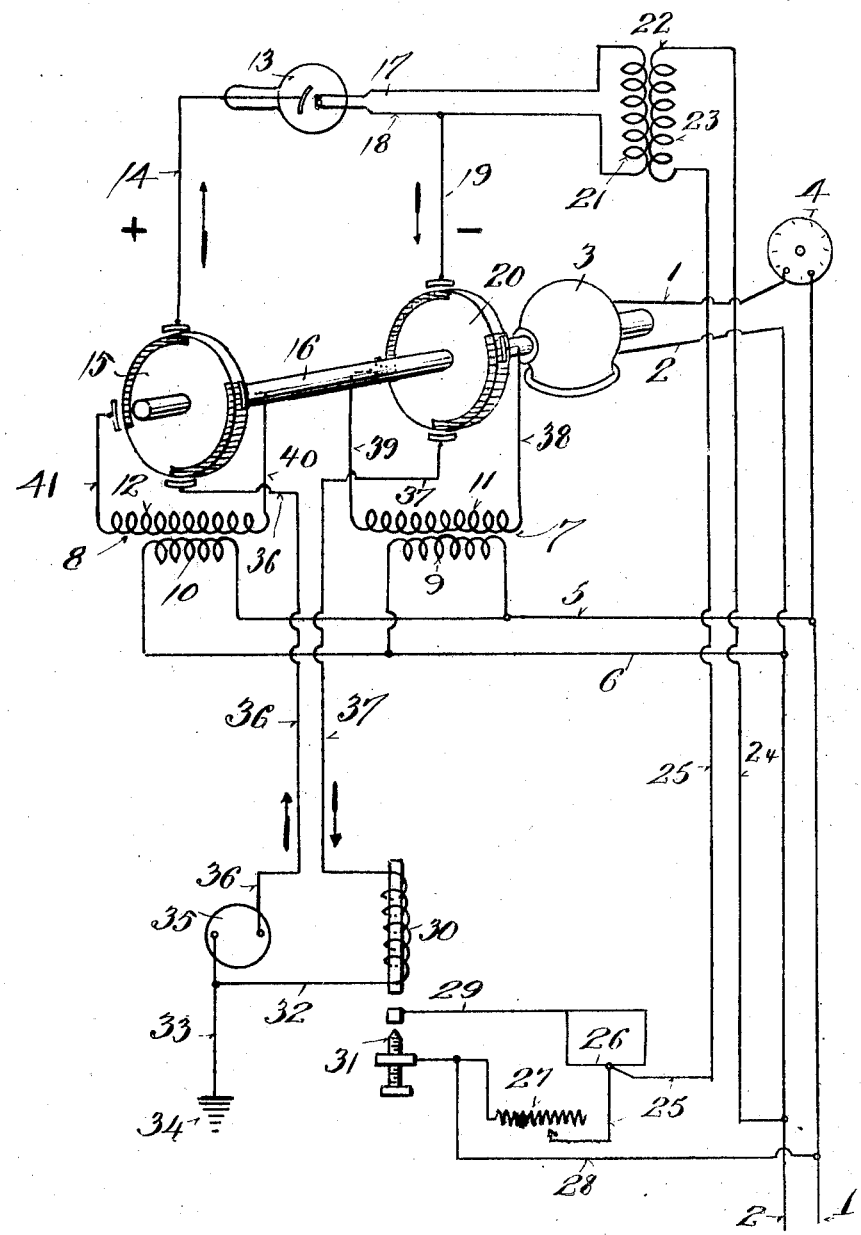
INVENTOR
*Harry D. Garretson.*
BY *H. O. Aedy Edwards*
ATTORNEY Patented May 17, 1927.

1,629,338

UNITED STATES PATENT OFFICE.

HARRY D. GARRETSON, OF NEW YORK, N. Y., ASSIGNOR TO HARRY F. WAITE, OF NEW YORK, N. Y.

X-RAY SYSTEM.

Application filed December 20, 1921. Serial No. 523,613.

The object of my invention is to provide current measuring and regulating devices so that the measuring and the regulating will take place entirely at the switch-board of the system in which my invention is employed and it is particularly applicable to systems where voltages of two hundred thousand, more or less, are employed which have two step-up transformers and two rectifying switches which are synchronously driven from a common shaft. This object is accomplished by my invention, one embodiment of which is hereinafter more particularly set forth.

For a more detailed description of my invention, reference is to be had to the accompanying drawings, forming a part hereof, in which the figure is a diagrammatic view of one embodiment of my invention.

1 and 2 represent the lead in wires which bring in any suitable current. To simplify the illustration and explanation, it is assumed that an alternating current goes in over these wires, of the usual commercial kind, and that these wires run to a synchronous motor 3 of any suitable kind and include in the circuit any suitable regulator 4 and switches or other devices, not shown, which may be desirable for use in this connection. The wires 1 and 2 also have wires 5 and 6 connected to them which run to the step-up transformers 7 and 8 respectively. These transformers are made suitable for X-ray work and have their primaries 9 and 10 and their secondaries 11 and 12.

The tube 13 of this system is preferably a large and powerful tube of the hot cathode type. This tube has its anode connected to a wire 14 which runs to one terminal of one rectifying switch 15 on a shaft 16 which is connected to the armature of the motor 3 and is driven directly by it. The cathode has two wires 17 and 18, one of which, say the wire 18, is connected to a wire 19 that runs to a terminal of the rectifying switch 20 which is also mounted on the shaft 16 and is driven by the motor 3. The wire 18 is also connected to one terminal of the secondary 21 of the step-down transformer 22 and the other terminal of this secondary 21 is connected to the wire 17. The primary 23 of this transformer 22 is connected to two wires 24 and 25, the wire 24 being connected directly to the wire 2 and the wire 25 running to a regulator 26 which includes a resistance 27 and a wire 28 connects this resistance 27 with the wire 1.

The regulator 26 has an armature 29 which is subject to a magnet 30 and this armature 29 may rest on a contact 31 when not subject to the influences of the magnet 30 with sufficient power to draw it away from this contact. When this armature rests on this contact a circuit is established through the same to the wire 28, as indicated, so that in this event the resistance 27 is short circuited.

The magnet 30 has one of its ends connected to a wire 32 which runs to a wire 33 which has one end grounded at 34 and its other end connected to a milliammeter 35. The other terminal of this milliammeter is connected by a wire 36 to a terminal of the rectifying switch 15. The other terminal of the magnet 30 is connected by a wire 37 to a terminal of the high potential switch 20.

The transformers 7 and 8 have their secondaries 11 and 12 connected to the two rectifying switches 20 and 15 by wires 38, 39, 40 and 41, as shown.

Assuming that the parts are as indicated, the operation of my improved system is as follows: It being assumed that power is derived through the wires 1 and 2 and that the shaft 16 is rotating so that the high potential switches 15 and 20 are functioning properly, the tube 13 is charged with a cathode heating current through the wires 17 and 18 and at the same time this tube is charged with an X-ray generating current which on the positive side comes from the rectifying switch 15 and on the negative side comes from the rectifying switch 20. Tracing the current from the cathode to the anode through the wire 18 to the wire 19, thence through the rectifying switch 20 to the wire 39, thence through the secondary 11 to the wire 38, thence through the rectifying switch 20 to the wire 37, thence through the relay magnet 30 to the wire 32 and from there through the milliammeter 35 to the wire 36 and thence through the rectifying switch 15 to the wire 40 and from there through the secondary 12 to the wire 41 and thence through the rectifying switch 15 to the wire 14. When polarity is reversed the circuit is the same, except that the current passes from the wire 19 through the switch 20 to the wire 38 and corresponding changes are made elsewhere so that in any event a high potential direct current is always passing through the wires 14 and 19 as long as the apparatus is in use. Furthermore, this identical current is passing through the milliammeter 35, but as it is grounded through the wire 33 it is at a neutral potential and therefore entirely without danger to any operator who may be observing the apparatus. If this current passing through the milliammeter 35 is more powerful than desired, the armature 29 will be attracted by the magnet 30 and then the resistance 27 comes into the circuit of the primary 23 of the transformer 22, whereby the cathode heating current is reduced and the current passing through the magnet 30 is correspondingly reduced so that by means of the regulator 26 it is possible for the operator to keep the milliammeter reading very nearly constant. As he is always reading directly from the current passing through the tube his reading is exceedingly accurate. Furthermore, as the potential of the milliammeter is substantially ground potential the operator is in no danger whatsoever and may observe the instrument to the best advantage. This is not possible as such instruments have been observed heretofore because they have been charged at the high potential of the tube and are therefore necessarily remote from the person regulating the system so that he cannot accurately read the instrument. By my improved system accurate and perfect reading at all times and corresponding regulation is made possible.

While I have shown and described one embodiment of my invention, it is obvious that it is not restricted thereto, but that it is broad enough to cover all claims that come within the scope of the annexed claim.

Having thus described my invention, what I claim is:

In a system of the class described, a milliammeter, a regulating device for regulating the flow of current through a hot cathode of an X-ray tube, an X-ray tube of the hot cathode type, means for connecting the hot cathode with a rectifying switch and means for connecting the rectifying switch with a step-up transformer, means for connecting the anode of the tube with a second rectifying switch and means for connecting the second rectifying switch with a second step-up transformer, means for energizing both transformers, means for driving both rectifying switches synchronously with each other and with the current passing through the step-up transformers, two wires running from two terminals of the rectifying switches, said wires being connected to the said milliammeter and the said regulating device, a step-down transformer for supplying a cathode heating current to the cathode of the X-ray tube and means for connecting the primary of the step-down transformer with the regulating device, whereby the power of the tube may be regulated.

In testimony whereof, I have hereunto set my hand and seal this 15th day of December, 1921.

HARRY D. GARRETSON.